Oct. 31, 1939.                H. A. HUTCHINS ET AL                2,178,280
                    POWER TAKE-OFF FOR POWER DRIVEN VEHICLES
                    Filed Feb. 15, 1936            5 Sheets-Sheet 1

INVENTOR
HUGH ALLEN HUTCHINS
BY JAMES S. STEWART

ATTORNEY.

INVENTOR
HUGH ALLEN HUTCHINS
& JAMES S. STEWART
BY
Floyd W. Harris
ATTORNEY.

Oct. 31, 1939.   H. A. HUTCHINS ET AL   2,178,280
POWER TAKE-OFF FOR POWER DRIVEN VEHICLES
Filed Feb. 15, 1936   5 Sheets-Sheet 3

INVENTOR
HUGH ALLEN HUTCHINS
BY JAMES S. STEWART

Ford H. Harris
ATTORNEY.

Oct. 31, 1939.   H. A HUTCHINS ET AL   2,178,280
POWER TAKE-OFF FOR POWER DRIVEN VEHICLES
Filed Feb. 15, 1936   5 Sheets-Sheet 4
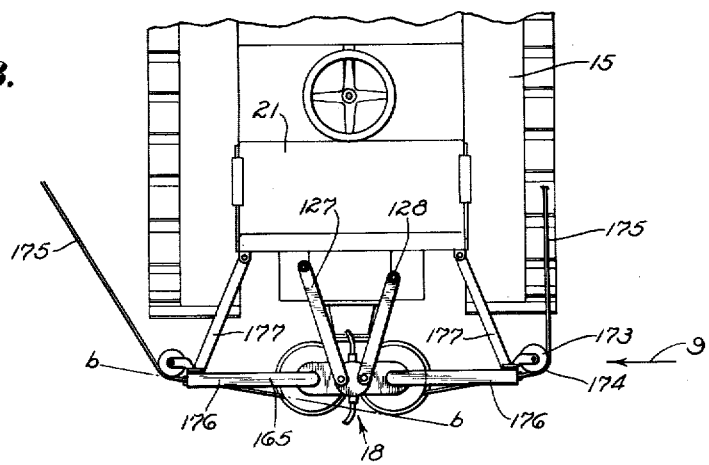
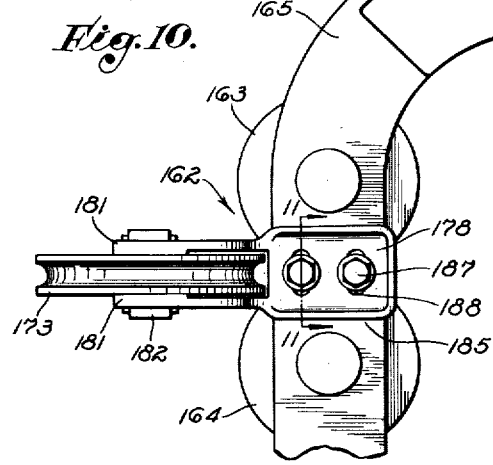
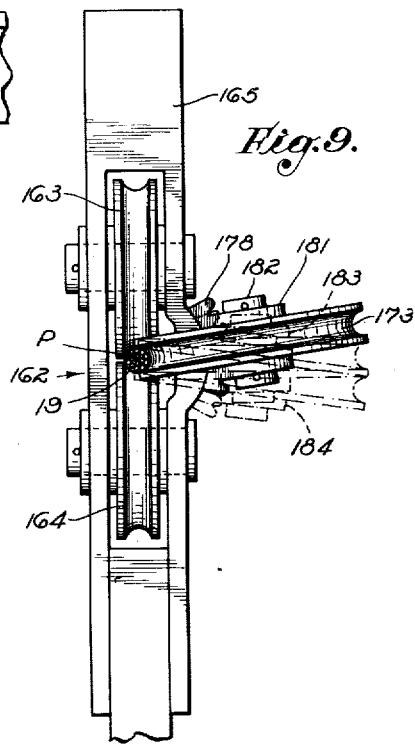
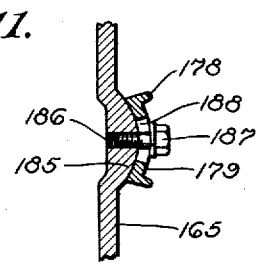
INVENTOR
HUGH ALLEN HUTCHINS
JAMES S. STEWART
BY
Ford W. Harris
ATTORNEY.

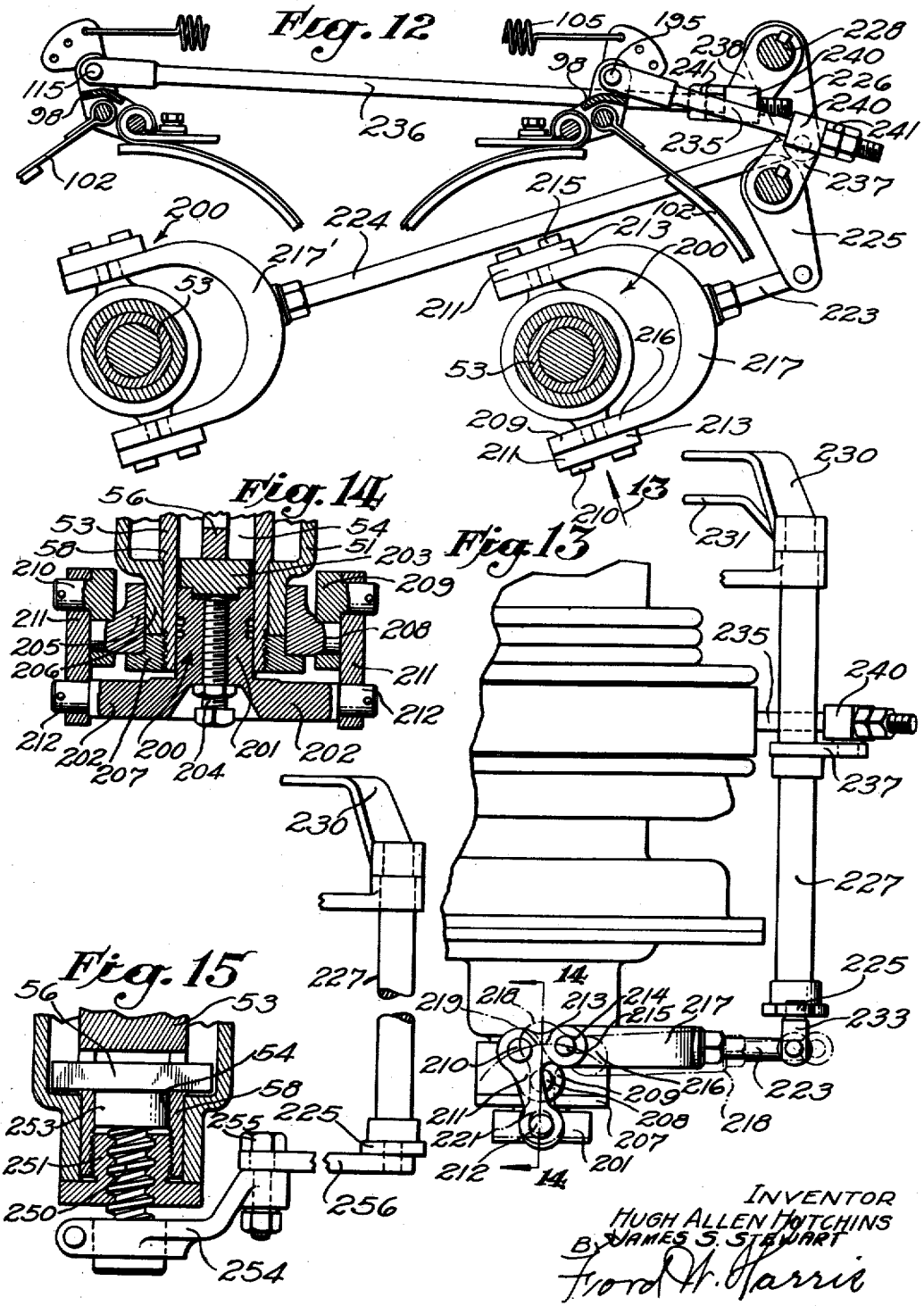

Patented Oct. 31, 1939

2,178,280

UNITED STATES PATENT OFFICE 2,178,280

POWER TAKE-OFF FOR POWER DRIVEN VEHICLES

Hugh Allen Hutchins, Glendale, and James S. Stewart, Los Angeles, Calif., assignors, by direct and mesne assignments, to Emsco Derrick & Equipment Company, Los Angeles, Calif., a corporation of California Application February 15, 1936, Serial No. 64,090

17 Claims. (Cl. 254—166)

Our invention relates to a device adapted to be secured to a power driven vehicle and being so constructed that it will transmit power from the power plant of the vehicle to selected power driven devices or mechanisms other than the wheels of the vehicle, such other devices or mechanisms being mounted on the vehicle or elsewhere, as, for example, on another vehicle which is propelled by the power driven vehicle.

The invention is of especial utility on tractors, the uses of which are multifarious. In addition to being used for the purpose of propelling or pulling various ground working and road making implements, ground working devices are often secured directly to the tractor. Our present invention has a diversity of uses in conjunction with power driven vehicles, and has for an object to provide a device of simple and durable construction having a power receiving element adapted to be connected to a power driven part of the vehicle and means whereby this power receiving element may transmit power, force, or movement to another part or mechanism either on the power driven vehicle or on another vehicle or implement which is being propelled thereby.

It is a further object of the invention to provide a device of the above character having a rotary member preferably in the form of a drum or spool on which a cable may be wound, means for driving the same in forward direction, together with releasable means for preventing reverse rotation of the rotary member.

It is a further object of the invention to provide a simple and effective means for controlling the operation of the power take-off.

It is a further object of the invention to provide a device of the above character having a spool rotating on an upright axis and means including a substantially horizontal shaft for driving the spool, there being a simple and self-aligning guide means for the cable which is wound upon the spool.

It is a still further object of my invention to provide a power take-off device in which the cable as it passes to the spool is guided so that the cable may be properly wound on the spool and yet at the same time the cable is free to move or swing so that it may extend directly to the apparatus which the cable controls or operates.

It is a still further object of my invention to provide a power take-off mechanism including a cable guide means which is supported so as to be swingable or movable laterally with respect to the axis of the spool of the mechanism but restrained from movement parallel to the axis of the spool or, in other words, axially of the spool.

Special features of our invention relate to its simplicity and durability through the use of a drive shaft which connects directly to a rotating part of the power means of the vehicle, transmission means on the shaft for continuously driving a rotary part on a substantially upright axis, a power receiving part preferably in the form of a spool mounted so as to rotate on the upright axis in a position adjacent the rotary member, and a simple form of clutch means operative between the rotary member and the spool, there being means for moving the rotary member and the spool relatively together and apart in a manner to control the engagement of the clutch means in accordance with the desired operation of the spool.

A further object of the invention is to provide a device as above described, in which a pair of spools may be carried in a compact casing or supporting structure and selectively driven through the use of a single drive shaft adapted to be connected to a rotating part of the vehicle on which the power take-off device is mounted.

Further objects and advantages of the invention will be made evident throughout the following part of the specification.

Referring to the drawings, which are for illustrative purposes only:

Fig. 8 is a fragmentary plan view showing the yokes of the device in position for running the cables forwardly on the tractor.

Fig. 9 is an enlarged fragmentary view looking in the direction indicated by the arrow 9 of Fig. 8.

Fig. 10 is a view looking toward the right side of Fig. 9.

Fig. 11 is an enlarged, fragmentary section taken as indicated by the line 11—11 of Fig. 10.

Fig. 12 is a sectional view of schematic character showing a mechanical means for actuating the device.

Fig. 13 is a fragmentary elevational view looking toward Fig. 12, as indicated by the arrow 13 of Fig. 12.

Fig. 14 is a fragmentary sectional view taken on a plane indicated by the line 14—14 of Fig. 13.

Fig. 15 is a fragmentary, partly sectioned view showing another type of mechanical means for actuating the power take-off.

Figure 1:
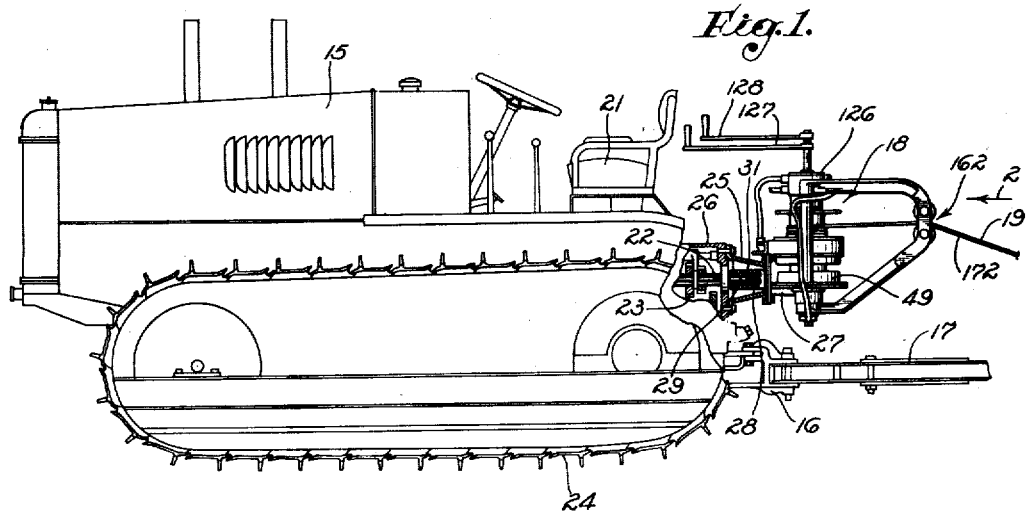
Fig. 1 is a partly sectioned side view showing a tractor equipped with a preferred form of our invention.

In Fig. 1 of the drawings, we show a tractor 15 of conventional type, having a draft connection 16 to which a pull bar 17 of a ground or road working implement may be connected. For the control or operation of parts or mechanisms carried by the implement controlled by the tractor, our invention provides a power take-off 18 from which cables 19 extend to the implement, to be there connected to the mechanism which is to be controlled or operated by an operator who occupies the tractor seat 21.

The power or driving equipment of the tractor 15 includes a shaft 22 having a gear 23 thereon forming a part of the transmission for driving the treads 24 of the tractor. Depending, of course, upon the tractor with which the invention is employed, an adaptor 25 is employed which is designed so as to be bolted onto the gear case 26 in place of the ordinary cover plate of such gear case 26. This adaptor 25 holds a central casing 27 of the power take-off 18 in such position that the drive shaft 28 of the power take-off 18 will be aligned with the rearward end 29 of the shaft 22.

Figure 3:
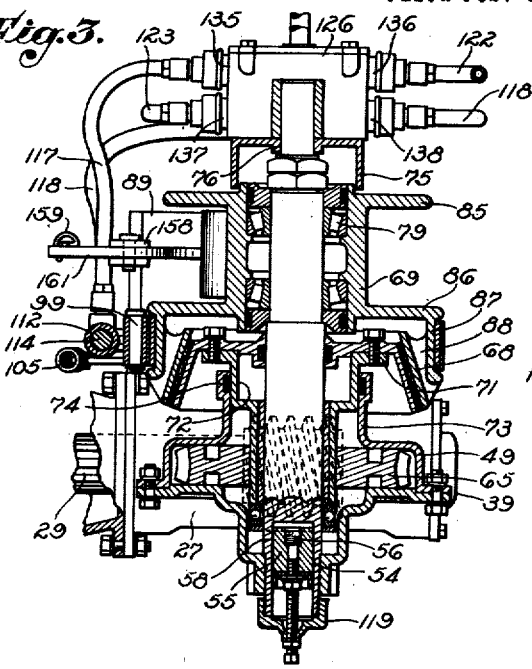
Fig. 3 is a section taken as indicated by the line 3—3 of Fig. 2.
Figure 3A:
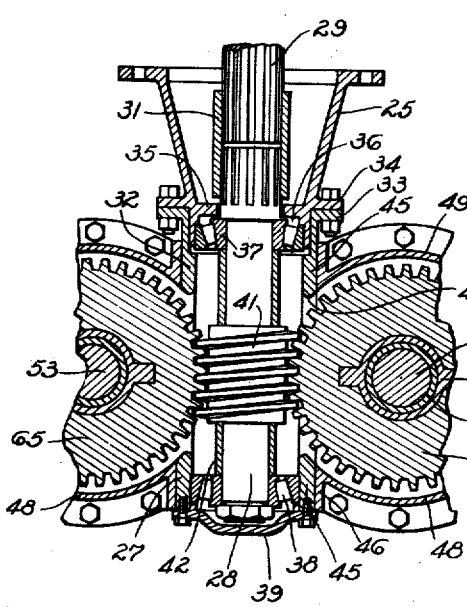
Fig. 3a is a fragmentary cross section taken as indicated by the line 3a—3a of Fig. 2, to show the manner of supporting the worm screw of the device.

As clearly shown in Fig. 3a, the central casing member 27 comprises a cylindrical wall 32 with a flange 33 at its rearward end whereby it may be secured to a flange 34 formed at the outer end of the adaptor 25. The adaptor 25 has a wall 35 across the end thereof formed with a recess 36 serving as a case for a roller type bearing 37 for supporting the shaft 28 at one end thereof. The other end of the shaft 28 is supported by a bearing 38, and the outer end of the casing member 27 is closed by a head plate 39. A worm or screw 41 is keyed to the shaft 28 and is held in spaced relation between the bearings 37 and 38 by spacer sleeves 42.

Figure 2:
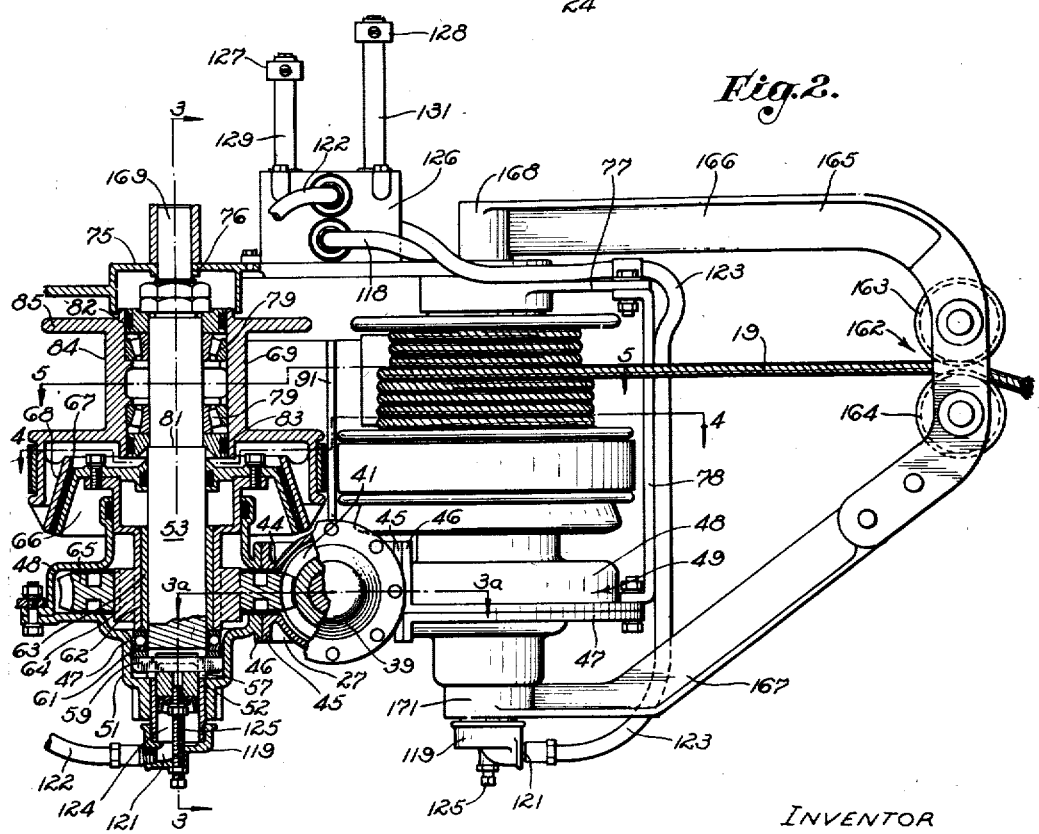
Fig. 2 is a partly sectioned view looking toward the power take-off device, as indicated by the arrow 2 of Fig. 1.

In diametrally opposed relation, openings 43 are formed in the sides of the wall 32, and around the openings 43 walls 44 are projected laterally and are equipped with flanges 45 in substantially vertical planes for connection to companion flanges 46 formed on cooperating base and cap members 47 and 48 of worm wheel cases 49, best shown in Figs. 2 and 3. The base member 47 of each case 49 is equipped with a downwardly extending wall 51 constricted at its lower end so as to hold the lower end 52 of a dead shaft 53 which extends in a plane disposed at substantially right angles to the axis of the shaft 28, or, in other words, in crossing relation to the shaft 28.

As shown in Figs. 2 and 3, the lower end of each shaft 53 is recessed to form a chamber 54 which is open at its lower end and in which a piston 55 is vertically slidable. A cross bar 56 is mounted in the upper part of each piston 55 and projects laterally through diametrally opposed slots 57 in the side wall 58 surrounding the upper part of each recess or chamber 54, so that the ends 59 thereof may engage a thrust bearing 61 which surrounds the lower part of the shaft 53 and supports a sleeve 62 which is adapted to rotate around the sleeve bearing 63 which is mounted on the shaft 53. The sleeve 62 has a circular body or collar 64 secured thereto, the circumferential portion of this body 64 being in splined engagement with a drive member or worm wheel 65, one each of which is placed in one of said cases 49 and projects through an opening 43 into engagement with the worm 41. Rotation of the screw 41 through its connection 31 with the shaft 22 of the tractor 15 causes rotation of the worm gears or wheels 65 on the substantially parallel axes of the said shafts 53. The parts connected between the power device of the tractor or vehicle and the sleeve 62 constitute a drive means, of which the worm wheel 65 constitutes a drive member thereof.

The sleeve 62 forms a part of a rotary element which also includes a clutch part 66 of upwardly converging conical type having a facing 67 of friction fabric material for engaging a cooperating clutch part 68 connected to the lower end of a spool 69. Each clutch part 66 is attached to a flange 71 formed at the upper end of a wall 72 which is of increased diameter relative to the sleeve 62 but is connected thereto so as to rotate substantially as a part thereof. By raising the pistons 55 in a manner to be hereinafter described, the sleeve 62 may be caused to move upwardly and carry the clutch parts 66 into engagement with the clutch parts 68. In so doing, the sleeves 62 and the collars 64 thereon both move upwardly through the worm wheels 65 which have rotary movement but no vertical movement.

Each cap member 48 of the cases 49 fits down closely on the worm wheel which it covers and has a cylindrical wall 73 projecting upwardly around the wall 72 at the upper end of the associated sleeve 62. Preferably packing rings 74 are provided between the walls 72 and 73, as shown, to prevent the splashing or working of oil from the cases 49.

A cross bar 75 extends across the upper ends of the dead shafts 53 and has openings 76 therein through which the upper reduced ends 169 of the shafts 53 project. The ends 77 of the cross bar 75 are tied to the worm wheel cases 49 by vertical bars 78 which assure the rigid supporting of the cross bar 75 and the upper ends of the shafts 53.

The two spools 69 are supported between the clutch parts 66 and the cross bar 75 by roller type bearing sets 79 mounted on the upper portions of the dead shafts 53 above shoulders 81. At the ends of the roller bearing assemblies 79, grease retainers 82 and 83 are placed, making it possible to pack the upper bearing means of the device with grease, whereas the lower bearing means consisting of the sleeve bearings 63 are lubricated by oil contained in the cases 49.

Each spool 69 has a cylindrical wall 84, an upper flange 85, and a larger lower flange 86 which supports a downwardly extending cylindrical wall 87 forming a brake drum. With the wall 87 are radial webs 88 which support the upper cooperating clutch part of the associated spool 69 susbtantially within the brake drum 87.

Figure 4:
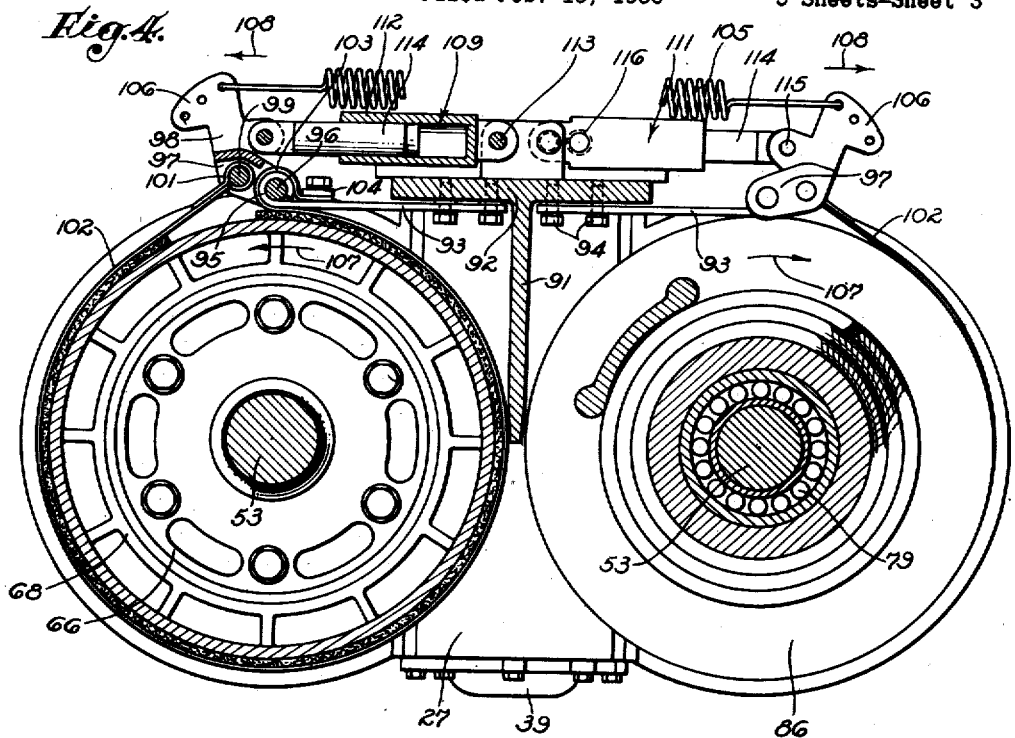
Fig. 4 is a cross section taken as indicated by the line 4—4 of Fig. 2.

As best shown in Figs. 3 and 4, the bracket 89 projects upwardly from the central casing 27, this bracket consisting of a wall 91 disposed in a longitudinal vertical plane and a lateral wall 92 which is aligned with the flange 33 of the central casing 27. The wall 92 has a pair of laterally extending brake band supports 93 secured thereto by means of screws 94. The outer ends 95 of the supports 93 are bent so as to form loops through which vertical pins 96 may be extended so as to serve as pivots for the forked ends 97 of brake levers 98. Each of these brake levers 98 carries a pin 99 in eccentric relation to its supporting pin 96 for receiving the moving end 101 of a brake band 102 which extends around a brake drum 87 and has its other end 103 wrapped around a member 95 and secured to the associated support 93 by screw means 104. A tension spring 105 is connected between lever arms 106 of the brake levers 98 so as to automatically pull the brake bands 102 tight against the drums 87. Being mounted in this manner, the brake bands 102 will permit rotation of the drums 87 in the directions of the arrows 107 in Fig. 4, but will lock the drums 87 against rotation in directions opposite to the arrows 107 unless the brake bands are first released by swinging the lever arms 106 in the directions of the arrows 108 to relieve the tension in the brake bands 102. As a means for swinging the lever arms 106 outwardly against the action of the spring 105, we provide expansible cylinder-piston means 109 and 111 each consisting of a cylinder 112 with means 113 for connecting it pivotally to the bracket 89, and a piston 114 having pivot means 115 at its outer end connecting it to a lever arm 106. Inlet openings 116 are provided for the cylinders 112 of the devices 109 and 111 to which pipes 117 and 118, Fig. 3 may be connected for the purpose of delivering fluid under pressure, such as oil, for example, to move the pistons 114 outwardly to release the brake bands 102.

As best shown in Figs. 2 and 3, inlet cap fittings 119 are screwed onto the lower projecting ends of the dead shafts 53 to provide means for closing the lower ends of the chambers 54 and for the induction of fluid under pressure to lift the pistons 55 when it is desired to engage either the rightward or the leftward clutch parts 66 and 68 so as to drive selected spools 69. The fittings 119 have inlet openings 121 to which pipes 122 and 123 are connected for the introduction of fluid under pressure to the spaces 124 below the pistons 55. The distance each piston 55 may drop is limited by an adjusting screw 125 threaded upwardly through each of the fittings 119.

Figure 7:
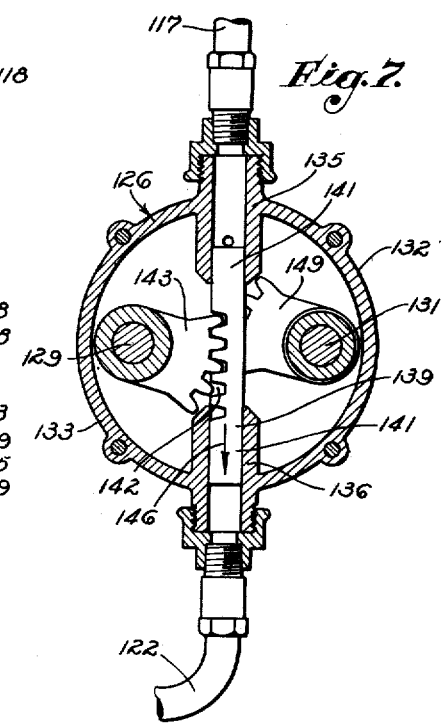
Fig. 7 is a sectional view taken as indicated by the line 7—7 of Fig. 6.
Figure 6:
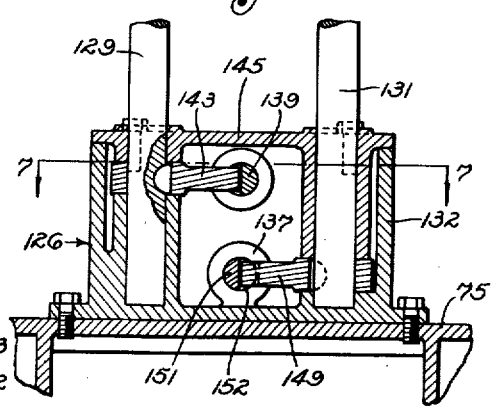
Fig. 6 is an enlarged, vertically sectioned view of the actuating member of the hydraulic control forming a part of the invention.

The simple hydraulic control which we have provided for the power take-off includes a movement-pressure transformer 126 in which the movement imparted to control levers 127 and 128 is transformed to fluid pressure in selected pipes 117, 118, 122, and 123. The levers 127 and 128 are respectively for the control of the left-hand and right-hand spools 69 of the power take-off, and are mounted on vertical shafts 129 and 131 which extend upwardly from the casing 132 of the transformer or pressure controller 126. As shown in Figs. 6 and 7, the device 126 has a wall 133 in which there are formed two upper, diametrally opposed cylinders 135 and 136, and two lower, diametrally opposed cylinders 137 and 138, the cylinders 135 and 137 facing forwardly, and the cylinders 136 and 138 facing rearwardly. A cylindrical bar 139 has the ends 141 thereof projecting into, and forming pistons in, the inner ends of the cylinders 135 and 136. The central portion of the bar 139 has rack teeth 142 formed on the left side thereof to be engaged by a gear segment 143 which is keyed to the shaft 129 which extends upwardly within the casing 132 and projects through the cover 145 thereof to receive on its upper end the lever 127. As the lever 127 is swung to the right, the segment 143 will be rotated in clockwise direction and move the bar 139 in such direction that the rearward end 141 thereof will move into the cylinder 136 in the direction indicated by the arrow 146 of Fig. 7, to force a fluid, such as oil, outwardly through the pipe 122 which connects with the space 124 at the lower end of the dead shaft 53, causing the piston 55 therein to raise the rotary member or sleeve 62 so that the left-hand clutch parts 66 and 68 will be brought into engagement to cause the left-hand spool 69 to rotate in the direction indicated by the left-hand arrow 107 of Fig. 4. When the lever 127 is swung leftwardly, the gear segment 143 will move the bar 139 in a direction opposite to the arrow 146 so as to force oil outwardly from the piston 135 and through the pipe 117, Fig. 3, to the expansible cylinder-piston device 109, to move the piston 114 thereof in leftward direction to release the brake band 102 of the left-hand spool 69.

From the foregoing it will be seen that a right-hand movement of the lever 127 causes the left-hand spool 69 to be driven, and a left-hand movement of the lever 127 causes the release of this spool so that it may freely rotate. In a like manner, the right-hand lever 128 is for control of the right-hand spool 69 of the power take-off. This lever 128 is attached to the upper end of the vertical shaft 131 which projects downwardly through the cover 145 into the casing 132 and has a gear segment 149 keyed to the lower end thereof so as to engage a bar 151 which is similar in all respects to the bar 139 with the exception that the rack teeth 152 thereof are faced rightwardly. The forwardly projecting cylinder 137 of the device 126 is connected to the pipe 123 which leads to the fitting 119 at the lower end of the right-hand dead shaft 53, so that when the lever 128 is swung rightwardly, the right-hand clutch parts 66 and 68 will be engaged and the right-hand spool 69 of the power take-off will be rotated in the direction indicated by the right-hand arrow 107 of Fig. 4. Likewise, the rearwardly projecting cylinder 138 of the device 126, shown in Fig. 3, is connected to the pipe 118 extending to the cylinder-piston mechanism 111, as shown in Fig. 4, whereby a leftward movement of the lever 128 will cause the bar 151 to move rearwardly and force oil from the cylinder 138 and through the pipe 118 to move the piston 114 of the cylinder-piston mechanism 111 rightwardly to release the brake band 102 associated with the right-hand spool 69 of the power take-off. The pipes 117, 118, 122, and 123 are of flexible character, and the controlling device 126 may be placed in a position convenient to the operator of the tractor 15.

Figure 5:
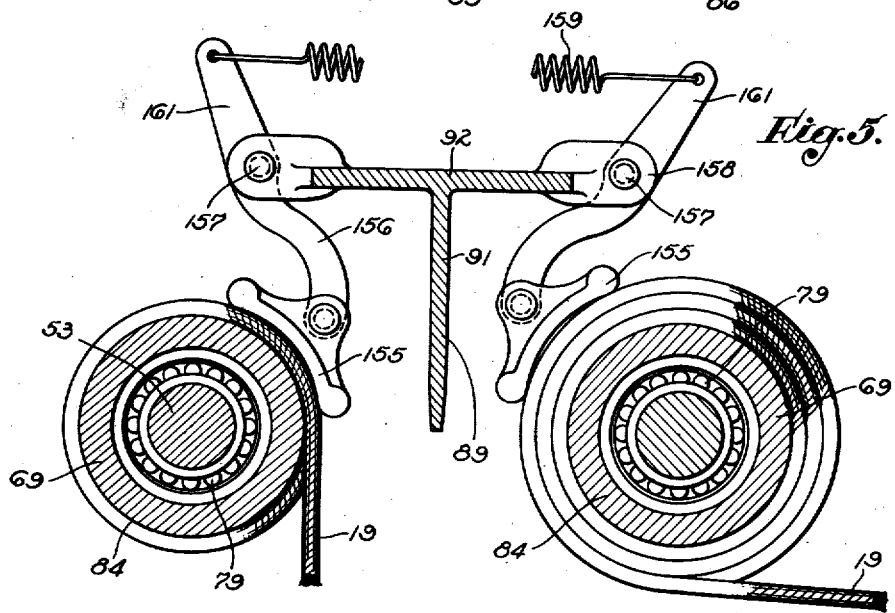
Fig. 5 is a cross section taken as indicated by the line 5—5 of Fig. 2, to show the cable-holding shoes of the device.

The left-hand and right-hand spools 69 respectively have cables 19 wound thereon. These spools are driven in complementary directions indicated by the arrows 107 of Fig. 4, and therefore the cables 19 are wound in the directions shown in Fig. 5. To hold the cables 19 tight upon the spools 69 and also to provide friction to resist free turning of the spools, cable spooling shoes 155 are mounted upon levers 156 so as to be pressed against the cables coiled on the spools. The shoes 155 are of a height to nearly touch the flanges 85 and 86 of the spools 69, and the levers 156 supporting the same are centrally fulcrumed on pivot pins 157 which, as shown in Fig. 5, are carried by forks 158 formed on the upper part of the bracket 89. A tension spring 159 is connected between free ends 161 of the levers 156 to rotate the same in directions to carry the shoes 155 into engagement with the coils of the cables 19 wound on the spools 69.

Guide means 162 for the cables 19 are provided in the form of pairs of sheaves 163 and 164 placed in side-by-side relation so as to engage the cables on opposite sides of the center lines thereof, as shown in Fig. 2. The guide means 162 are mounted so as to swing in arcs about the spools 69, and in spaced relationship thereto, by yokes 165 each having an upper arm 166 and a lower arm 167, the upper arms 166 having sleeves 168 for engaging the upwardly projecting ends 169 of the dead shafts 53, and the lower arms 167 having bosses 171 which engage the lower end of a member 47, as shown in Fig. 2, so as to swing thereon. Accordingly, as the cables 19, which extend as indicated at 172 in Fig. 1 to a following vehicle, are swung laterally due to the changes in the position of the vehicle relative to the tractor 15, the yokes 165 move so as to swing the guide means 162 correspondingly. In the form of my invention illustrated in Fig. 2 the yoke is shown as being pivotally mounted on the axis of the dead shaft 53. It will be understood, however, that the yoke may be pivoted eccentrically of the axis of the shaft 53 or may be mounted so that it is not pivotally but slidably mounted in a horizontal plane. It will be seen that the guide means is immovable in a plane parallel to the axis of rotation of the spool, but is movable in a plane at right angles thereto, or, in other words, it is movable in a lateral plane or is movable laterally with respect to the spool. The term "laterally" when used in the claims has the significance just pointed out. As shown in Fig. 8, the sheaves 163 and 164 are disposed with their grooves or channels in planes, such as the plane b—b, tangential to the coils of the cables 19 on the spools 69. A further feature of the invention is the provision of means whereby the cables 19 may be also extended forwardly to operate parts or devices situated forwardly on the tractor 15. In this case, as shown in Figs. 8 and 9, a third sheave 173 is used which rotates on an axis disposed in crossing relation to the axis of the cooperating sheaves 163 and 164, so that the cable may pass outwardly from the sheaves 163 and 164 and then bend forwardly over the sheave 173, as indicated at 174 in Fig. 8, to then extend forwardly along one side of the tractor 15, as indicated at 175. When the third sheave 173 is used, the yoke 165 is secured in laterally extending relation, as indicated at 176 in Fig. 8, by means of a brace 177 which may be connected to some suitable part of the tractor 15.

Each sheave 173 is supported by a detachable bracket 178 consisting of an arcuate plate 179 and forks 181 extending therefrom through which an axle pin 182 for the sheave 173 is passed. This detachable bracket is so formed that it may be adjustably secured to the yoke 165 in upwardly sloping position as shown in full lines in Fig. 9, or in the other positions indicated by dotted lines 183 and 184. Each yoke 165 has a wall 185 curved so as to form an arc around the center line of the cable 19 where it passes through the sheaves 163 and 164. The plate 179 of the bracket 178 is curved to fit this wall 185, as shown in Fig. 11, and therefore as the plate 179 is moved upwardly or downwardly relative to the wall 185, it will swing the associated sheave 173 radially with respect to the point P of Fig. 9, thereby maintaining the sheave 173 in proper alignment with its cooperating sheaves 163 and 164. The wall 185 has centralized openings 186 which are threaded for screws 187, and the plate 179 of the cooperating bracket 178 is provided with vertically elongated slots 188 through which the screws 187 pass as shown in Fig. 11, the slots 188 permitting vertical movement of the bracket 178.

To replace the hydraulic controlling means previously described herein, where such is desired, we have devised a simple form of mechanical controlling or actuating means for the power take-off, one form of mechanical device being shown in Figs. 12, 13, and 14, and the other form being shown in Fig. 15. As shown in Fig. 14, the fitting 119 shown in Figs. 2 and 3 has been removed from the lower end of each vertical shaft 53, and from each chamber 54 in the lower end of each shaft 53 the hydraulic piston 55 of Figs. 2 and 3 has been removed. In place of the pistons we employ a pair of mechanical thrust devices, one each of which is employed at the lower end of a vertical shaft 53, and each of which thrust devices is made as shown in Fig. 14.

This thrust device, indicated by the numeral 200 in Fig. 14, comprises a cylindrical body 201 which projects upwardly into the chamber 54 of the shaft 53 and has a pair of diametrally opposed arms 202 formed on the lower end thereof below the lower end of the wall 58 which surrounds the chamber 54. On the upper end of the cylindrical body 201 a block 203 is placed, and for the purpose of adjustment an adjustment screw 204 is threaded vertically through the cylindrical body 201 so as to engage the lower end of the block 203, the upper face of which block engages the cross bar 56 previously described herein. It will be understood that by raising the body 201, vertical movement may be transmitted to the cross bar 56 so that this cros bar 56 will in turn raise the member 62 of Fig. 2, thereby raising the clutch member 66 into engagement with the cooperating clutch part 68 which is attached to a spool 69.

The raising of the cylindrical body 201 is accomplished as follows: A ring 205 is placed around the cylindrical wall 206 constituting the lower extremity of the wall 51. This ring 205 is supported by a flanged collar 207 which is threaded onto the lower extremity of the wall 58. Accordingly, the ring 205 may rotate on the wall 206, but its downward movement is limited by the collar 207. The ring 205 has a pair of diametrally opposed trunnions 208 projecting therefrom, and on each of these trunnions 208 a relatively short lever member 209 is mounted. The levers 209 extend upwardly from the trunnions 208, and the upper portions of these levers 209 have pins 210 projecting outwardly therefrom. Vertical links 211 having openings in the lower and upper ends thereof are placed in vertical positions so that the lower ends thereof will engage trunnions 212 of the arms 202 and so that the upper ends thereof will engage the pins 210 of the levers 209. As shown in Figs. 12 and 13, the upper ends of the links 211 are provided with forward extensions 213 provided with openings 214 through which pins 215 may outwardly extend, such pins 215 being formed at the ends or arms 216 of a yoke member 217. As best shown in Fig. 13, the parts 209, 211, and 217 reside in the positions in which they are shown in full lines when the cylindrical body 201 is in its lowered position to permit the clutch part 66 to reside in lowered position out of engagement with the cooperating clutch part 68. It will be noted that at this time the links 211 are swung to the left, and it will be also noted that the pins 210 on the upper ends of the levers 209 are disposed to the left of a vertical plane extending through the trunnions 208 of the ring 205. Now, to engage the clutch parts 66 and 68, the links 211 are swung to the right by rightward movement transmitted thereto through the yoke 217, thereby swinging the links 211 into the dotted line positions thereof indicated by the numeral 218. The rightward movement of the links 211 carries the pins 210 of the levers 209 rightwardly and upwardly through an arc such as indicated at 219 in Fig. 13, the result being that the links 211 are raised so as to carry the trunnions 212 of the arms 202 upwardly into the position indicated by dotted lines 221, thereby raising the body 201 from its lowered position, which action as hereinbefore described results in raising the clutch part 66 into engagement with the cooperating clutch part 68.

One of the thrust devices 200 previously described is placed at the lower end of each vertical shaft 53 of the power take-off so that, as shown in Fig. 12, there are a pair of yokes 217 disposed in the spaced relation determined by the lower ends of the shafts 53. The yokes 217 indicated in Fig. 12 as 217 and 217' are connected through suitable pull bars 223 and 224 with levers 225 and 226 mounted respectively at the lower ends of vertical shafts 227 and 228. The shafts 227 and 228 are preferably mounted toward one side of the power take-off, and suitable levers are provided at their upper ends whereby these shafts may be rotated through relatively short arcs so as to swing the levers 225 and 226 which are mounted on the lower ends of the shafts 227 and 228, in the directions required thereof to pull the yokes rightwardly to accomplish actuation of the thrust mechanisms 200 associated therewith. To illustrate this, I have shown a lever 230 mounted on the upper end of the vertical shaft 227 in Fig. 13. In view of the fact that the shaft 228 lies directly behind the shaft 227, it does not appear in Fig. 13, but the lever which extends from the shaft 228 is designated at 231. If the handle or lever 230, shown in Fig. 13, is swung leftwardly so as to rotate the vertical shaft 227 in anti-clockwise direction, the lever 225 at the lower end of the shaft will be rotated in anti-clockwise direction, and the movement of the end thereof will be transmitted through a connecting fork or clevis 233 to the pull bar 223, with the result that the yoke 217 will be moved rightwardly and the thrust device 200 at the lower end of the right-hand shaft 53 of the power take-off will be actuated, thereby actuating the clutch of the right-hand power take-off. Likewise, a leftward swinging of the handle 231 will rotate the shaft 228 in anti-clockwise direction, causing the crank lever 226 at the lower end thereof to swing in anti-clockwise direction and exert a pull on the bar 224 so as to move the yoke 217' and actuate the thrust mechanism 200 disposed at the lower end of the right-hand shaft 53 so that the righthand clutch of the power take-off will be actuated.

Where the mechanical control is employed instead of the hydraulic control, the cylinders 112, Fig. 4, are removed together with their associated parts 114, and from the pins 115 of the brake levers 98 actuating rods 235 and 236 are extended to short levers 237 and 238 mounted respectively on the shafts 227 and 228 intermediate the ends thereof. The levers 237 and 238 each have a block 240, and the bars or rods 235 and 236 are extended through horizontally disposed openings in the blocks 240 so that the bars 235 and 236 may slide relative to the blocks 240 when the blocks 240 are swung in one direction, stop nuts 241 being provided on the bars 235 and 236 to cause movement of said bars when the levers 237 and 238 are swung in clockwise direction.

Previously herein we have described how anticlockwise rotation of the shafts 227 and 228 actuates the clutches of the power take-off. Clockwise rotation of the shafts 227 and 228 will cause release of the brake bands 102 which are associated therewith. For example, if the handle or lever 230, Fig. 13, is swung to the right so that the lever 237 will be rotated in clockwise direction, a pulling force will be transmitted through the bar 235 to swing the right-hand lever 98 in clockwise direction so as to release the right-hand brake 102. In a similar manner, if the handle 231 is swung rightwardly so as to rotate the lever 238 in clockwise direction, the thrust of the block 240 carried by the lever 238 will be applied to the stop nuts 241 of the bar 236, and the bar 236 will be caused to move in a leftward direction so as to swing the leftward crank 98 in anti-clockwise direction and release the leftward brake 102.

In Fig. 15 we show a form of vertically acting thrust means which may be substituted for the cylindrical body 201 and its associated mechanism, shown in Figs. 13 and 14, this thrust means consisting of a screw 250 which is threaded upwardly through a block 251 threaded into the lower end of the wall 58 at the lower end of a shaft 53. The screw 250 bears against the lower face of a block 253 which is vertically slidable in the upper part of the chamber 54, and the upper portion of the vertically movable block 253 engages the bar 56 which has been previously described. On the lower end of the screw 250 a lever 254 is adjustably mounted, this lever 254 carrying a bolt 255 at its outer end through which it may be connected to a pull bar 256 which extends to the lever 225 at the lower end of the vertical shaft 227. When the handle 230 is rotated in anti-clockwise direction, the lever 225 will be swung so as to exert a pull in the bar 256 which will swing the lever 254 and rotate the screw 250 in such direction that the screw will advance upwardly through the threaded block 251, thereby lifting the block 253 and the cross bar 56 which will in turn raise the member 62 and carry the clutch part 66 into engagement with its cooperating clutch part 68.

Although we have herein shown and described our invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

We claim as our invention:

1. A power take-off of the character described, adapted for mounting on a power driven vehicle having a power drive, including: a supporting means adapted to be secured to the vehicle in a position to cooperate with said power drive; a spool carried by said supporting means so as to rotate on an upright axis; drive means operatively connected to said spool and the power drive of said vehicle to rotate said spool, said drive means including a rotary part which is brought into connection with said power drive of said vehicle when said supporting means is secured in place on said vehicle, and a friction clutch adapted to connect said rotary part to said spool; a cable connected to said spool so as to be wound thereon; a guide means for said cable; and a member supporting said guide means so that it may move horizontally in an arc around said spool and so that said guide means will support said cable at a point spaced from said spool.

2. A power take-off of the character described, adapted for mounting on a power driven vehicle having a power device, including: a supporting means adapted to be connected to the vehicle; a spool carried by said supporting means so as to rotate on an upright axis; drive means operatively connected to said spool and the power device of said vehicle to rotate said spool; a cable connected to said spool so as to be wound thereon; a guide arm placed so as to swing in an arc around said spool; and a pair of sheaves carried by the outer portion of said arm so as to rotate on horizontal axes and to engage said cable on opposite sides of the center line of the cable.

3. A power take-off of the character described, adapted for mounting on a power driven vehicle having a power device, including: a supporting means adapted to be connected to the vehicle: a spool carried by said supporting means so as to rotate on an upright axis; drive means operatively connected to said spool and the power device of said vehicle to rotate said spool; a cable connected to said spool so as to be wound thereon; a guide arm placed so as to swing in an arc around said spool; a pair of sheaves carried by the outer portion of said arm so as to rotate on horizontal axes and to engage said cable on opposite sides of the center line of the cable; and a third sheave secured to said arm so as to rotate on an upright axis and in a reclining plane disposed between said first named sheaves.

4. A power take-off of the character described, adapted for mounting on a power driven vehicle having a power device, including: a supporting means adapted to be connected to the vehicle; a spool carried by said supporting means so as to rotate on an upright axis; drive means operative between said spool and the power device of said vehicle to rotate said spool; a cable connected to said spool so as to be wound thereon; a guide arm placed so as to swing in an arc around said spool; guide means for said cable carried by the outer part of said arm in a position supporting said cable at a point spaced from said spool and in a plane normal to the axis of said spool; and a shoe to resiliently press said cable against said spool.

5. A power take-off of the character described, adapted for mounting on a power driven vehicle having a power device, including: a supporting member adapted to be connected to the vehicle; a dead shaft carried by said supporting member, said shaft having a cavity in one end thereof and a slot through the side wall of said cavity; a spool mounted on said shaft so as to turn, said spool having a clutch element connected to one end thereof; a rotary member on said shaft movable to and from said spool; a cooperating clutch part on said rotary member adapted to engage said clutch element; means for connecting said rotary member to the power device of said vehicle so as to rotate said rotary member; and means for moving said rotary member to and from said spool so as to control the engagement of said clutch element and said clutch part, said last named means having a part exterior of said shaft for engaging said rotary member, actuating means in said cavity, and connecting means extending through said slot from said actuating means to said part exterior of said shaft.

6. A power take-off of the character described, adapted for mounting on a power driven vehicle having a power device, including: a supporting member adapted to be connected to the vehicle; a dead shaft carried by said supporting member, said shaft having a cavity in one end thereof and a slot through the side wall of said cavity; a spool mounted on said shaft so as to turn, said spool having a clutch element connected to one end thereof; a rotary member on said shaft movable to and from said spool; a cooperating clutch part on said rotary member adapted to engage said clutch element; means for connecting said rotary member to the power device of said vehicle so as to rotate said rotary member; and means for moving said rotary member to and from said spool so as to control the engagement of said clutch element and said clutch part, said last named means having a part exterior of said shaft for engaging said rotary member, a piston in said cavity, means for applying a fluid under pressure to said cavity to move said piston, and connecting means extending through said slot from said fluid applying means to said part exterior of said shaft.

7. A power take-off of the character described, adapted for mounting on a power driven vehicle having a power device, including: a supporting member adapted to be connected to the vehicle; a dead shaft carried by said supporting member, said shaft having a cavity in one end thereof and a slot through the side wall of said cavity; a spool mounted on said shaft so as to turn, said spool having a clutch element connected to one end thereof; a rotary member on said shaft movable to and from said spool; a cooperating clutch part on said rotary member adapted to engage said clutch element; means for connecting said rotary member to the power device of said vehicle so as to rotate said rotary member; means for moving said rotary member to and from said spool so as to control the engagement of said clutch element and said clutch part, said last named means having a part exterior of said shaft for engaging said rotary member, a piston in said cavity, means for applying a fluid under pressure to said cavity to move said piston, and connecting means extending through said slot from said fluid applying means to said part exterior of said shaft; a releasable means for preventing reverse rotation of said spool; fluid actuated means for releasing said releasable means; and means for applying fluid pressure to said fluid actuated means when it is desired to release said releasable means.

8. A power take-off of the character described, adapted for mounting on a power driven vehicle having a power device, including: a supporting structure adapted to be connected to said vehicle; a power receiving shaft carried by said supporting structure; means for connecting said power receiving shaft to a rotating part of the power device of said vehicle; a pair of vertically disposed dead shafts arranged on opposite sides of the axis of said power receiving shaft; a rotary member mounted on each of said dead shafts; drive means operated by said power receiving shaft to drive said rotary members; a cable spool turnably mounted on each of said dead shafts adjacent said rotary members; co-engaging clutch parts mounted on said rotary members and said spools;

means for moving said rotary members and said spools relatively together so as to engage said clutch parts; releasable means for preventing reverse rotation of said spools; and means for releasing said releasable means.

9. A power take-off of the character described, adapted for mounting on a power driven vehicle having a power device, including: a supporting structure adapted to be connected to said vehicle; a power receiving shaft carried by said supporting structure; means for connecting said power receiving shaft to a rotating part of the power device of said vehicle; a pair of vertically disposed dead shafts arranged on opposite sides of the axis of said power receiving shaft; a rotary member mounted on each of said dead shafts; drive means operated by said power receiving shaft to drive said rotary members; a cable spool turnably mounted on each of said dead shafts adjacent said rotary members; co-engaging clutch parts mounted on said rotary members and said spools; and means for moving said rotary members and said spools relatively together so as to engage said clutch parts.

10. A power take-off of the character described, adapted for mounting on a power driven vehicle having a power device, including: a supporting structure adapted to be connected to said vehicle; a power receiving shaft carried by said supporting structure; means for connecting said power receiving shaft to a rotating part of the power device of said vehicle; a pair of dead shafts disposed on opposite sides of the axis of said power receiving shaft; a rotary member mounted on each of said dead shafts; a worm screw on said power receiving shaft; a worm wheel on each of said rotary members and being engaged by said worm screw so as to drive said rotary members; a spool mounted on each of said dead shafts adjacent said rotary members; cooperating clutch parts on said rotary members and said spools; clutch operating means for moving said rotary members and said spools relatively together so as to cause engagement of said cooperating clutch parts, said clutch operating means comprisng walls forming a fluid expanded means having a part moving in response to fluid pressure therein; releasable means for preventing reverse rotation of said spools; means for releasing said releasable means, said releasing means comprising a fluid expanded means having a moving part connected to said means for preventing reverse rotation of said spools; and manually operated means for selectively producing a flow of fluid under pressure into said fluid expanded means to actuate the same.

11. A power take-off of the character described, adapted for mounting on a power driven vehicle having a power device, including: a supporting means adapted to be secured to said vehicle; a pair of spools in substantially side-by-side relation and rotatable on substantially parallel axes; drive means for rotating said spools in complementary directions; control means for controlling the operation of said drive means; a brake drum formed on each of said spools; a brake band around each of said brake drums, each of said bands having one end thereof connected to a fixed pivot and the other end thereof connected to a movable pivot, there being means exerting a yieldable force to move said movable pivots in directions to tighten said brake bands on said drums; a releasing piston-cylinder member connected to each of said movable pivots so that expansion thereof will move said movable pivots in directions to loosen said bands on said drums; control piston-cylinder means each connected to one of said releasing piston-cylinder members by walls forming conduits for fluid under pressure; and manually operated means for contracting said control piston-cylinder means to force fluid therefrom to the said releasing piston-cylinder members connected thereto.

12. A power take-off of the character described, adapted for mounting on a power driven vehicle having a power device, including: a supporting means adapted to be connected to the vehicle; a spool carried by said supporting means so as to rotate on an upright axis; drive means operatively connected to said spool and the power device of said vehicle to rotate said spool; a cable connected to said spool so as to be wound thereon; a guide arm placed so as to swing in an arc around said spool; a guide support placed laterally with respect to said spool; a pair of sheaves carried by said guide support in a horizontal plane through said spool so as to rotate on horizontal axes and to engage said cable on opposite sides of the center line of the cable; and a third sheave secured to said arm so as to rotate on an upright axis and in a reclining plane disposed between said first named sheaves.

13. A power take-off of the character described, adapted for mounting on a power driven vehicle having a power device, including: supporting means adapted for connection to the vehicle; cable carrying means rotatably carried by said supporting means; drive means operatively connected to said cable carrying means and the power device of said vehicle to rotate said cable carrying means; a cable connected to said cable carrying means so as to be wound thereon; guide means disposed so as to swing in an arc around said cable carrying means during operation and being movable in response to a force applied thereto by said cable; and a pair of sheaves carried by said guide means so as to rotate on axes substantially perpendicular to the axis of rotation of said cable carrying means and to engage said cable on opposite sides of the cable.

14. A power take-off of the character described, adapted for mounting on a power driven vehicle having a power device, including: a supporting means adapted to be connected to the vehicle; cable carrying means rotatably carried by said supporting means so as to rotate on an upright axis; drive means operatively connected to said cable carrying means and the power source of said vehicle to actuate said cable carrying means; a cable connected to said cable carrying means so as to be wound thereon; a yoke placed with the ends thereof straddling said cable carrying means and adapted to swing in an arc around said cable carrying means; and guide means for said cable carried by the outer part of said yoke in a position supporting said cable at a point spaced from said cable carrying means and in a plane normal to the axis of said cable carrying means.

15. A power take-off of the character described, adapted for mounting on a power driven vehicle having a power device, including: a supporting means adapted to be connected to the vehicle; a spool rotatably carried by said supporting means; drive means operatively connected to said spool and the power device of said vehicle to rotate said spool; a cable connected to said spool so as to be wound thereon; a guide means for said cable adapted to swing in an arc around said spool during operation and being movable in response to a force applied thereto by said cable; a pair of sheaves carried by said guide means so as to rotate on horizontal axes and to engage said cable on opposite sides of the center line of the cable; and an auxiliary sheave carried by said guide means so as to rotate on an upright axis and in a reclining plane disposed between said first named sheaves.

16. A power take-off of the character described, adapted for mounting on a power driven vehicle having a power device for use in conjunction with a following structure, including: a supporting means adapted to be connected to said vehicle; a spool rotatably carried by said supporting means, said spool being rotatable on a vertical axis; drive means operatively connected to said spool and the power device of said vehicle to rotate said spool; a cable connected to said spool so as to be wound thereon and extending rearwardly to said following structure; guide means engageable by the portion of said cable extending from said spool; and means for supporting said guide means to restrain movement of said guide means in a vertical plane relative to said spool and operable in response to a force applied thereto through said cable to permit movement of said guide means in a horizontal plane relative to said spool.

17. A power take-off of the character described, adapted for mounting on a power driven vehicle having a power device for use in conjunction with a following structure, including: a supporting means adapted to be connected to said vehicle; a spool rotatably carried by said supporting means, said spool being rotatable on a vertical axis; drive means operatively connected to said spool and the power device of said vehicle to rotate said spool; a cable connected to said spool so as to be wound thereon and extending rearwardly to said following structure; guide means engageable by the portion of said cable extending from said spool; and means for supporting said guide means which is mounted so as to be movable only in a horizontal plane and perpendicular to the axis of said spool.

HUGH ALLEN HUTCHINS.
JAMES S. STEWART.

CERTIFICATE OF CORRECTION.

Patent No. 2,178,280.                                    October 31, 1939.

HUGH ALLEN HUTCHINS, ET AL.

It is hereby certified that error appears in the printed specification of the above numbered patent requiring correction as follows: Page 6, first column, lines 47 and 48, claim 4, for the words "operative between" read operatively connected to; and that the said Letters Patent should be read with this correction therein that the same may conform to the record of the case in the Patent Office.

Signed and sealed this 2nd day of January, A. D. 1940.

(Seal)                                                                Henry Van Arsdale,
Acting Commissioner of Patents.

movable in response to a force applied thereto by said cable; a pair of sheaves carried by said guide means so as to rotate on horizontal axes and to engage said cable on opposite sides of the center line of the cable; and an auxiliary sheave carried by said guide means so as to rotate on an upright axis and in a reclining plane disposed between said first named sheaves.

16. A power take-off of the character described, adapted for mounting on a power driven vehicle having a power device for use in conjunction with a following structure, including: a supporting means adapted to be connected to said vehicle; a spool rotatably carried by said supporting means, said spool being rotatable on a vertical axis; drive means operatively connected to said spool and the power device of said vehicle to rotate said spool; a cable connected to said spool so as to be wound thereon and extending rearwardly to said following structure; guide means engageable by the portion of said cable extending from said spool; and means for supporting said guide means to restrain movement of said guide means in a vertical plane relative to said spool and operable in response to a force applied thereto through said cable to permit movement of said guide means in a horizontal plane relative to said spool.

17. A power take-off of the character described, adapted for mounting on a power driven vehicle having a power device for use in conjunction with a following structure, including: a supporting means adapted to be connected to said vehicle; a spool rotatably carried by said supporting means, said spool being rotatable on a vertical axis; drive means operatively connected to said spool and the power device of said vehicle to rotate said spool; a cable connected to said spool so as to be wound thereon and extending rearwardly to said following structure; guide means engageable by the portion of said cable extending from said spool; and means for supporting said guide means which is mounted so as to be movable only in a horizontal plane and perpendicular to the axis of said spool.

HUGH ALLEN HUTCHINS.
JAMES S. STEWART.

CERTIFICATE OF CORRECTION.

Patent No. 2,178,280.                         October 31, 1939.

HUGH ALLEN HUTCHINS, ET AL.

It is hereby certified that error appears in the printed specification of the above numbered patent requiring correction as follows: Page 6, first column, lines 47 and 48, claim 4, for the words "operative between" read operatively connected to; and that the said Letters Patent should be read with this correction therein that the same may conform to the record of the case in the Patent Office.

Signed and sealed this 2nd day of January, A. D. 1940.

(Seal)                                              Henry Van Arsdale,
                                                        Acting Commissioner of Patents.